# 2,882,725

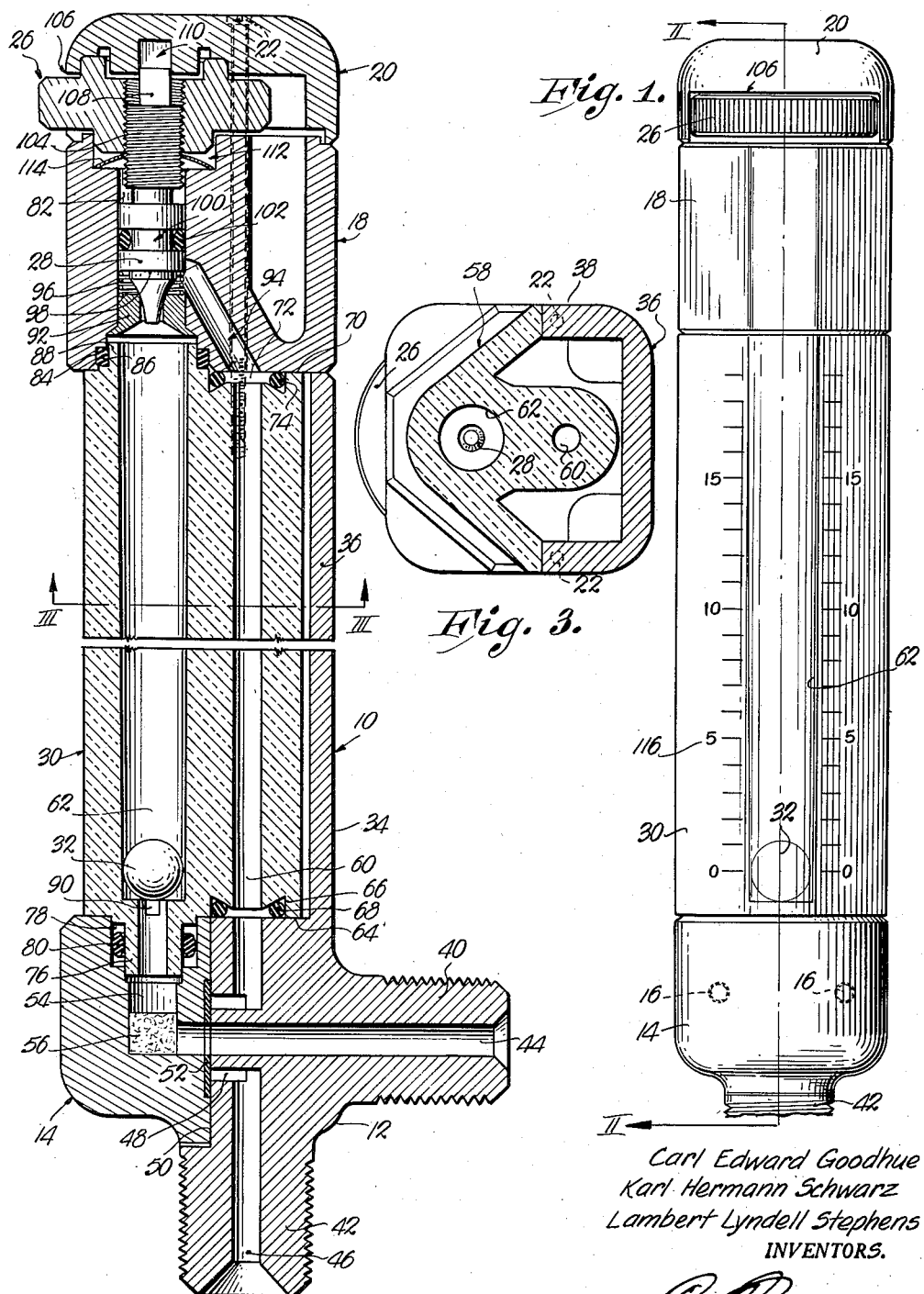
April 21, 1959    C. E. GOODHUE ET AL    2,882,725
FLOWMETER STRUCTURE
Filed Nov. 19, 1956
Carl Edward Goodhue
Karl Hermann Schwarz
Lambert Lyndell Stephens
INVENTORS.
BY
ATTORNEY.

FLOWMETER STRUCTURE

Carl Edward Goodhue, Hickman Mills, and Karl Hermann Schwarz, Kansas City, Mo., and Lambert Lyndell Stephens, Kansas City, Kans., assignors to Puritan Compressed Gas Company, Kansas City, Mo., a corporation of Missouri Application November 19, 1956, Serial No. 623,120

1 Claim. (Cl. 73—209)

This invention relates to fluid metering devices, and more particularly, to flowmeters used in conjunction with therapeutic devices for measuring the rate of flow from a pressure controlled gas supply line to a point of application, such as an anesthetic machine or an oxygen mask.

It is the primary object of the instant invention to improve upon the flowmeter disclosed in U.S. Patent Number 2,778,223.

Another important object of the instant invention is to provide flowmeter structure that is adaptable for die casting of virtually all of its component parts, and which in all respects is easier and less expensive to manufacture, assemble and maintain than the flowmeter of said patent.

A further object of the instant invention is to provide flowmeter structure having improved means of sealing the joints between the component parts thereof.

A still further object of the instant invention is to provide a flowmeter that is highly sensitive to adjustment by virtue of the elimination of backlash between the control valve thereof and its seat.

Further objects include many important improved details of construction to be made clear as the following specification progresses.

In the drawing:

Figure 1 is a fragmentary, elevational view of flowmeter structure made pursuant to our present invention.

Fig. 2 is an enlarged, cross-sectional view taken on line II—II of Figure 1; and Fig. 3 is a cross-sectional view taken on line III—III of Fig. 2.

The primary component parts of the flowmeter structure illustrated in the drawing, include a body 10 having an integral boss 12 on the normally lowermost end thereof, a member 14 secured to the boss 12 through use of releasable attaching means 16, a head 18 interposed between body 10 and a cap 20, means 22 for releasably attaching head 18 and cap 20 to body 10, valve means 28, manually manipulable means 26 for controlling valve means 28, an elongated, transparent measuring element 30, and a spherical device 32 housed within the element 30.

Body 10 includes an elongated, transverse, U-shaped back 34 having a bight 36 and a pair of spaced legs 38. The boss 12 of the back 34 is provided with a pair of threaded studs 40 and 42 angularly displaced relatively for interposing the flowmeter within the pressurized fluid system with which the flowmeter structure is adapted to be used.

Boss 12 is provided with an inlet 44 and an outlet 46 within a common plane and, therefore, boss 12 is provided with an annular channel 48 forming a part of the outlet 46 in surrounding relationship to inlet 44 and extending into face 50 of boss 12. Attaching means 16 holds the member 14 flatly against the face 50 and houses a disc gasket 52 separating channel 48 from inlet 44.

The member 14 is provided with an L-shaped hole 54 that communicates directly with inlet 44 and which receives a filter 56 of any suitable material.

The element 30 is interposed between the boss 12 and the head 18 and is, therefore, held clamped in place by fastening means 22. Except for the provision of a pair of longitudinal wings 58 integral with the element 30, the latter is transversely elliptical as shown in Fig. 3, and therefore, has a portion thereof housed by the back 34 between the legs 38 thereof. Such portion of the element 30 is provided with a longitudinal opening 60 that is therefore disposed between the legs 38 and in direct alignment with the upper end of outlet 46. Element 30 is also provided with an elongated, tapered passage 62 in substantial parallelism with the opening 60 and disposed in alignment with the hole 54 of member 14. The wings 58 converge as the passage 62 is approached and the vertical edges of wings 58 and legs 38 are in abutting relationship as best seen in Fig. 3.

The lowermost end of the element 30 not only engages the upper face of member 14, but abuts uppermost surface 64 of boss 12. A cavity 66 in the element 30 surrounding the opening 60, progressively decreases in depth as the opening 60 is approached and receives an O-ring 68 which is compressed between the element 30 and the surface 64 of boss 12.

Similarly, head 18 has a lowermost surface 70 that engages not only the uppermost edge of back 34, but the element 30, the latter of which is provided with a cavity 72 similar in nature to cavity 66 and receiving an O-ring 74.

Element 30 is provided with a stem 76 that extends into the hole 54 of member 14 and hole 54 has an enlargement 78 that receives an O-ring 80 surrounding the stem 76. Similarly, a bore 82 within the head 18 is provided with an enlargement 84 receiving an O-ring 86 that surrounds a stem 88 on the element 30. The O-rings 80 and 86 are compressed radially but free to float toward and away from each other within their respective enlargements 78 and 84. Manifestly, the passage 62 passes through the stems 76 and 88 and a bridge 90 within the stem 76 supports the spherical device 32 when at the lowermost end of its path of travel to prevent complete closure of the passage 62.

The lowermost end of the bore 82 has a perforated seat 92 tightly fitted therein between passage 62 and a port 94 for receiving the tapered end of valve means 28. Port 94 is formed in the head 18 and registers with the bore 82 to place the upper end of opening 60 into communication with bore 82. A spring 96 is coiled about the valve means 28 between seat 92 and a downwardly facing shoulder 98 on the valve means 28. An annular groove 100 in the valve means 28 receives an O-ring 102 that is radially compressed but floatingly movable longitudinally of the bore 82 in the same manner as O-rings 80 and 86.

Valve means 28 is provided with a threaded shank 104 upon which the manually manipulable means in the nature of a nut 26 is threaded. Nut 26 is interposed between the cap 20 and the head 18 and extends through a slot 106 in the former for accessibility to the operator. A polygonal extension 108 on the shank 104 slides within a similarly shaped socket 110 in the cap 20 to prevent rotation of the valve means 28 when the nut 26 is rotated. A recess 112 within the head 18 and constituting an enlargement of the bore 82 at the upper end of the latter, receives a disc spring 114 that surrounds the shank 104 and is interposed between the nut 26 and the head 18.

Calibrations 116 on the element 30 are provided to indicate the rate of fluid flow as a function of the spherical device or ball 30.

It is apparent from the foregoing that the form and construction of the component parts, particularly the body 10 with its boss 12, the head 18, the cap 20 and the element 30, readily adapts the use of die casting operations in the manufacture of the flowmeter. The above described construction also eliminates the necessity of high precision manufacture since the passage 62 will readily align with bore 82 and with hole 54 and the opening 60 will similarly align properly with the bore 94 and the outlet 46 by virtue of the provision of enlarged cavities 66 and 72 and the manner of sealing the joints between the element 30 and surfaces 64 and 70 by compressed O-rings 68 and 74. In a similar manner the seals 80 and 86 remain effective whether or not an exact fit is provided between the element 30, the head 18 and the member 14.

Finally, by provision of the springs 96 and 114, backlash of the valve means 28 against the set 92, is prevented.

Having thus described the invention what is claimed as new and desired to be secured by Letters Patent is:

In a flowmeter having a head and a body, the latter being provided with structure spaced from the head, there being a bore and a port in the head, and said structure having a hole and outlet, a back integral with said structure between the latter and the head, the back being transversely U-shaped, presenting a bight and a pair of legs; an elongated, transversely elliptical measuring element between the head and said structure and partially embraced by said legs, said element having a first longitudinal passage spanning the distance between the bore and the hole and a second longitudinal passage spanning the distance between the port and the outlet in communication therewith; opposed tubular stems on said element extending into the bore and the hole respectively placing the same in communication with said first passage; O-ring seals surrounding the stems within the bore and the hole respectively; an O-ring sealing device between the head and said element; and O-ring sealing device between said structure and the element, said element having cavities receiving the devices to hold the same concentric with the second passage, said devices having an appreciably larger diameter than the second passage, the port and the outlet whereby the same compensate for misalignment between the stems, the bore and the hole; releasable means attaching the head to said back and clamping the element between the head and said structure, said stems being shiftable in the bore and the hole whereby the devices are compressed when the element is clamped; and opposed wings on the element engaging said legs for holding the element against rotation whereby the second passage is maintained in alignment with the port and the outlet.

References Cited in the file of this patent

UNITED STATES PATENTS

| | | |
|---|---|---|
| 2,023,008 | Deming | Dec. 3, 1935 |
| 2,073,372 | Heidbrink | Mar. 9, 1937 |
| 2,313,889 | Porter | Mar. 16, 1943 |
| 2,778,223 | Kimbrell | Jan. 22, 1957 |